Oct. 18, 1955     D. L. SCHWARTZ     2,721,027
AERATED BAIT PAIL

Filed May 20, 1952     2 Sheets-Sheet 1

INVENTOR
DAVID L. SCHWARTZ

BY Hyman Hurwitz

ATTORNEY

Oct. 18, 1955     D. L. SCHWARTZ     2,721,027
AERATED BAIT PAIL

Filed May 20, 1952     2 Sheets-Sheet 2

INVENTOR
DAVID L. SCHWARTZ

BY Hyman Hurwitz

ATTORNEY

United States Patent Office 2,721,027
Patented Oct. 18, 1955

2,721,027
AERATED BAIT PAIL
David L. Schwartz, Hollywood, Fla.
Application May 20, 1952, Serial No. 288,930
3 Claims. (Cl. 230—160)

The present invention relates generally to aerating devices for live bait containers, and more particularly to aerating devices of simplified construction, capable of economical fabrication, suitable for maintaining efficient self-aeration of a relatively large body of water for a long time, and which is rugged and fool-proof in operation.

It is a primary object of the invention to provide a live bait pail aerator capable of sustained aeration.

It is a further object of the invention to provide a collapsible aerator of unitary rugged construction.

Another object of the invention resides in the provision of an aerating device for live bait containers, which can be charged with air by means of a single operation, specifically involving the manual separation of two parts of the device.

It is another object of the invention to provide a simplified aerator in which the rate of aeration may be simply determined, yet which requires no adjustable valves for this purpose.

It is still another object of the invention to provide an aerator constructed of a minimum number of simple parts, and which is substantially free of maintenance requirements, by virtue of its simplicity.

The above and still further features, objects and advantages of the invention will become apparent upon consideration of the following detailed description of a specific embodiment of the invention, especially when taken in conjunction with the accompanying drawings, wherein.

Figure 1:
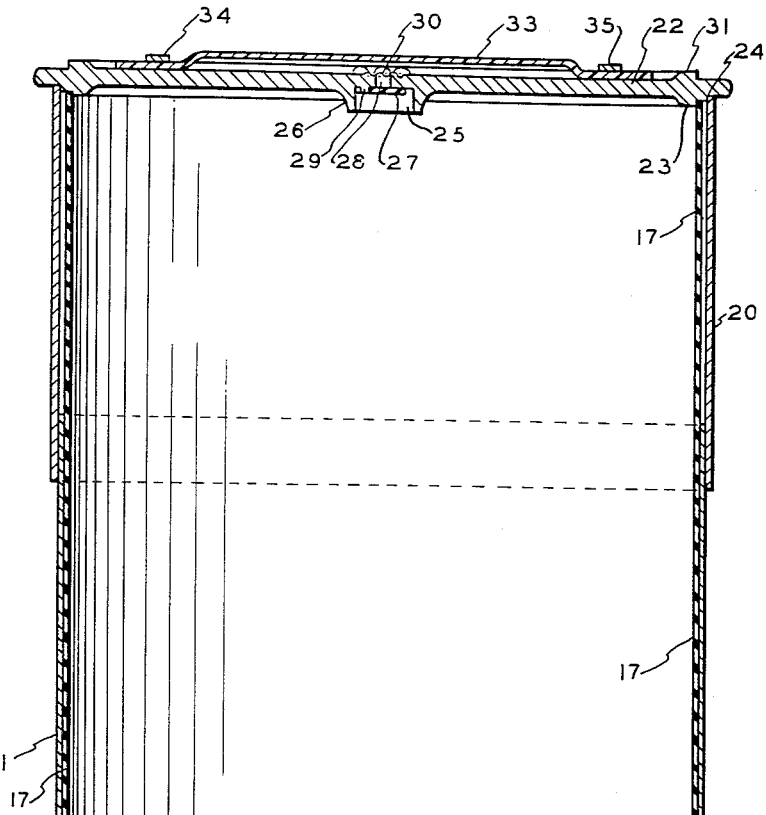
Figure 1 is a view in longitudinal section of an aerator arranged in accordance with the present invention.
Figure 2:
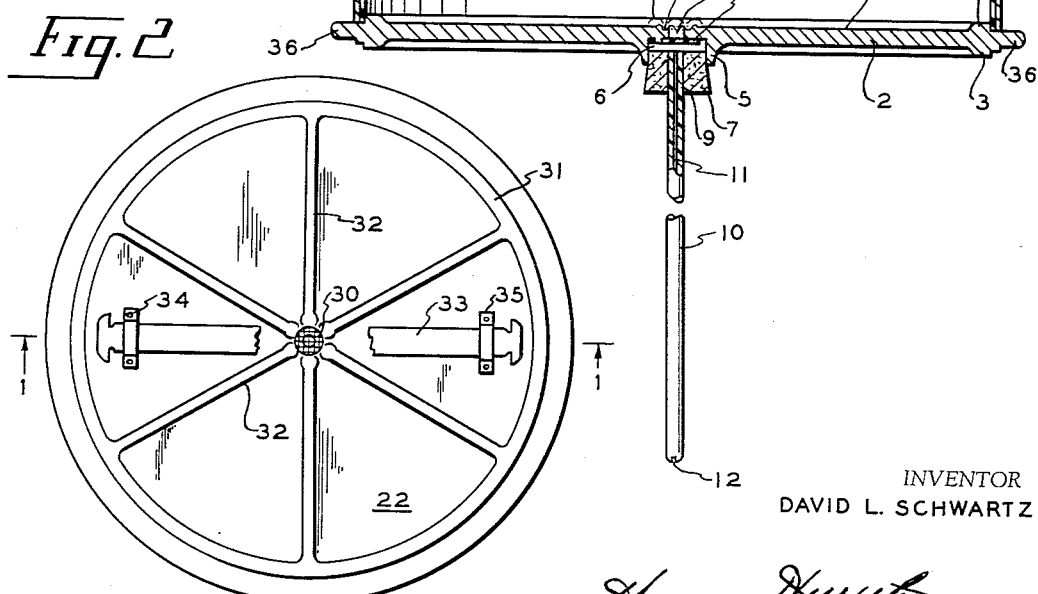
Figure 2 is a view in plan of the device of Figure 1.
Figure 3:
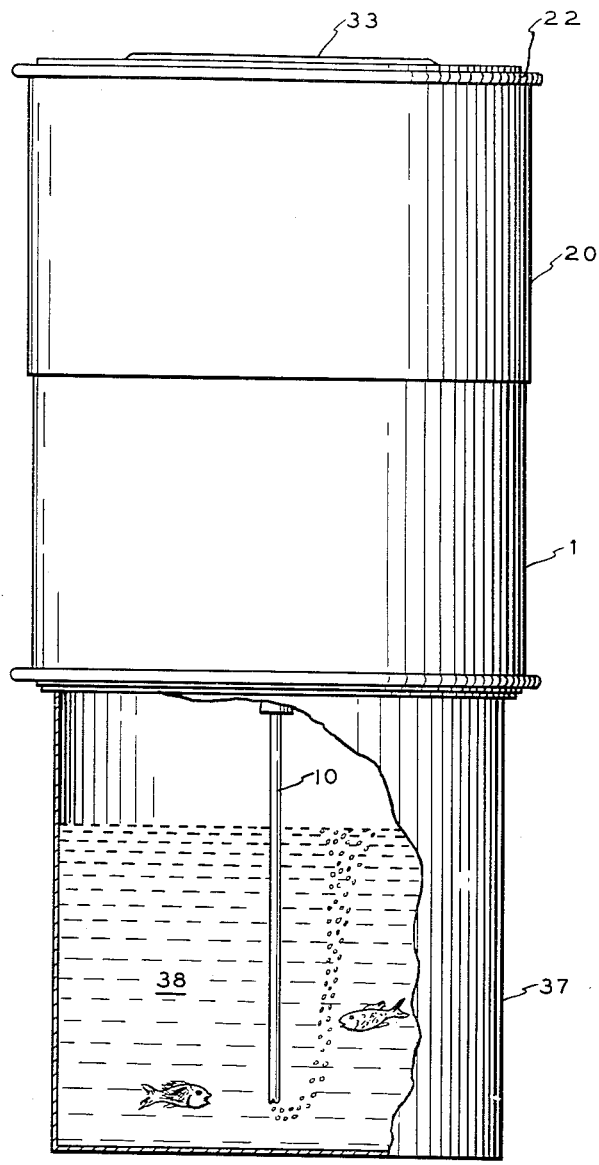
Figure 3 is a view in front elevation of the device of Figures 1 and 2, with a wall portion of the lower bait container part of the device broken away.

Referring now more particularly to the accompanying drawings, the reference numeral 1 identifies the lower cylindrical wall of an aerator, in accordance with the present invention. The wall 1 may be fabricated of plastic material, metal or the like, as desired, and is open at both ends.

A base member 2 closes the lower end of the cylindrical wall 1. The base member 2 may be fabricated of plastic material, or may be die cast of aluminum or other light metal, as desired, and is provided with an annular downwardly extending rim 3, which is scalloped or otherwise indented on its lower edge, to provide for air passages. A small axial boss 5 is provided, in the base member 2, having a circular indentation 6, capable of supporting a cork 7, preferably of rubber, and a small aperture 8 which serves as an air passage.

The cork 7 may be provided with an aperture 9, concentric with the aperture 8, in which is snugly inserted a flexible tube 10 having a narrow axial passage 11 terminating in an opening 12 at the end of the tube.

Secured to the flat wall of the indentations 6, is a flap valve 13 for the aperture 8, sufficient space being provided between the flap valve 13 and the rubber cork 7 to enable the flap to open, and thereby to admit air to the flexible tube 10. The flap valve 13 may be fabricated of a small flat piece of rubber, cemented, or otherwise secured, at one point to the flat wall of the indentation 6, and free at its other end. The inner wall of the base member 2 may be provided with radial ribs 15 terminating in slightly enlarged portions, as 16, to provide a recess for a strainer S. The latter may be cemented in place, and serves to keep debris out of the aperture 8, and thus to keep free an air passage to the tube 10.

Intermediate the cylindrical wall 1 and the base member 2 is provided a flexible plastic cylinder or sleeve 17, the sleeve 17 being cemented to the outer edge of an upper rim 18, formed on base 2. The cylindrical wall 1 is cemented to the sleeve 17, at the same point, so as to provide an air tight and water tight seal.

The sleeve 17 may further be cemented to the interior of the wall 1 for a considerable portion of its height, or for its entire height, as desired, and accordingly forms a relatively rigid portion of an air reservoir. The sleeve 17 then extends beyond the upper edge of the wall 1 for a distance nearly as great as the height of the wall 1.

A further cylinder 20 is provided, concentric with and external of the cylinder 1, and sliding freely but without substantial play on the outer surface thereof. The sleeve 17 extends within the cylinder 20, which is rigid per se, being fabricated of metal, plastic, or the like, and the sleeve 17 being flexible, can collapse as the cylinder 20 rides down the cylinder 1, but provides for a complete absence of air leakage.

The cylinder 20 is closed at its upper end by means of a cover plate 22, having formed in its base an annular rib 23, to the outer edge of which the sleeve 17 may be cemented. The cylinder 20 may be secured in any convenient fashion as by cementing to a further annular rib 24, of greater diameter than the rib 23, and formed in the base of the cover plate 22.

When I have spoken of cementing of rigid parts, I realize that welding techniques may be employed if metal parts are involved, that metal brackets or tongue and groove constructions may be employed in the case of plastic materials, to supplement cementing, and the like, and I do not desire to be limited, accordingly, to any specific type of construction or to any specific character of material, for the rigid portions of my invention.

The cover plate 22 is provided with a central recess 25, in an axial base 26, within which is secured a flap valve 27, over an axial aperture 28. The flap valve 27 opens inwardly, to uncover the aperture 28, and may be cemented at one point to the base wall of the recess 25, or hung over a projection 29 formed in the base wall of the recess 25, as desired. A filter 30 may be applied over the upper end of the aperture 28, to prevent entrance of foreign matter.

An annular rim 31 is provided, extending upwardly from the top surface of the cover plate 22, to provide strength, and a series of radial ribs 32 may further be provided, for the same purpose, these being terminated about the filter 30.

A carrying strap 33 is provided, secured to a cover plate at two support loops 34 and 35, secured to or integral with the cover plate. The strap 33 may be looped over the support loops with sufficient play that the strap may lie flat (as shown), or raised to permit entrance of the fingers thereunder.

In operation, the entire aerator may be charged with air by separating the upper and lower portion to the full extent permitted by the sleeve 17. To facilitate this operation, an annular extension 36 of the cover plate 22 is provided, which may be held under the feet while upward force is applied via strap 33 to the cylinder 20.

Air enters via flap valve 27, which closes when the charging movement of the device ceases, entrapping air. The device is then set on a bait container, as 37, having water 38 therein, the base member 2 resting on the upper rim of the container 37, but permitting access to the air outside by reason of the scalloped or apertured nature of the rim 3. The tube 10 then extends into the water 38.

A weight, such as a tackle box (not shown), may be placed on the cover plate 22, greater or smaller in magnitude, in accordance with the desired rate of flow of air to the bait container, and as the top section of the aerator is forced down by the weight air is forced past the lower valve 13, into the water 38, aerating the latter.

While I have described and illustrated one specific example of the present invention it will be clear that variations of the specific details of construction may be resorted to without departing from the true spirit of the invention as defined in the appended claims.

What I claim is:

1. An aerator for live bait containers comprising a first member comprising a first hollow cylinder having a base plate and an interior wall, a second member comprising a second hollow cylinder having a cover plate and an interior wall, a first valve in said cover plate arranged only to admit air into said second hollow cylinder, a second valve in said base plate arranged only to pass air from said first hollow cylinder, an elongated tube extending from and communicating with said second valve, said first and second cylinders being co-axial and of sufficiently different diameters to enable free relative axial motion therebetween, and a flexible air and water tight sleeve being secured along the entire edge of one of its ends to said base plate and being secured along the entire edge of the other of its ends to said cover plate.

2. The combination in accordance with claim 1 wherein said base plate is provided with an annular upwardly extending rim, and wherein said cover plate is provided with an annular downwardly extending rim, and wherein said sleeve is secured to said rims.

3. An aerator for a live bait container comprising a normally axially vertical collapsible sleeve, said sleeve having an inner and an outer surface being air tight, a first closure plate secured to the upper open end of said sleeve, said first closure having an air inlet valve therein, a second closure plate secured to the lower open end of said sleeve, said second closure plate having an air outlet valve therein, a first rigid cylinder snugly surrounding said sleeve about approximately its lower half and secured along its entire lower edge to said second closure plate, a second rigid cylinder loosely surrounding said sleeve about approximately its upper half and secured along its entire upper edge to said first closure plate, said cylinders axially movable one over the other in substantially sliding and guided relation to form an outer radial limit for said outer surface of said sleeve during collapse thereof.

References Cited in the file of this patent

UNITED STATES PATENTS

| | | |
|---|---|---|
| 1,377,077 | Irwin | May 3, 1921 |
| 2,408,306 | Flournoy | Sept. 24, 1946 |